United States Patent [19]

Hewitt

[11] Patent Number: 5,181,447
[45] Date of Patent: Jan. 26, 1993

[54] ADJUSTABLE PROTECTING GUARD APPARATUS FOR A BLADE OF A TABLE SAW

[76] Inventor: Timothy Hewitt, P.O. Box 839, Royal Oak, Mich. 48068-0839

[21] Appl. No.: 674,165

[22] Filed: Mar. 25, 1991

[51] Int. Cl.⁵ .............................................. B27G 19/02
[52] U.S. Cl. ....................................... 83/447; 83/478; 83/520; 83/860; 83/DIG. 1; 83/477.2
[58] Field of Search ...................... 83/477.2, 478, 520, 83/860, DIG. 1, 447

[56] References Cited

U.S. PATENT DOCUMENTS

| | | | |
|---|---|---|---|
| 302,041 | 7/1884 | Sill | 83/478 |
| 1,126,970 | 2/1915 | Folmer | 83/478 |
| 1,255,886 | 2/1918 | Jones | 83/478 |
| 1,311,508 | 7/1919 | Harrold | 83/860 |
| 1,526,128 | 2/1925 | Flohr | 83/478 |
| 1,993,219 | 3/1935 | Merrigan | 83/478 |
| 3,105,530 | 10/1963 | Peterson | 83/478 |
| 3,249,134 | 5/1966 | Vogl et al. | 83/478 |
| 3,315,716 | 4/1967 | Mytinger | 83/478 |
| 3,880,032 | 4/1975 | Green | 83/102.1 |
| 3,949,636 | 4/1976 | Ball et al. | 83/478 |
| 4,033,218 | 7/1977 | Donatelle | 83/478 |
| 4,517,869 | 5/1985 | Kuhlmann et al. | 83/100 |
| 4,625,604 | 12/1986 | Handler | 83/102.1 |
| 4,875,398 | 10/1989 | Taylor et al. | 83/478 |

Primary Examiner—Hien H. Phan
Attorney, Agent, or Firm—Gifford, Groh, Sprinkle, Patmore and Anderson

[57] ABSTRACT

An adjustable protecting guard apparatus for a table saw having a guard positionable over the saw blade. The adjustable protection guard apparatus has a telescoping arm extending from one end of the saw table which supports a guard superstructure. A hinged connection on an edge of the guard superstructure permits the guard superstructure and the attached guard to pivot up and away from the saw blade. A control module simultaneously deactivates the motor rotating the saw blade with the pivoting of the guard superstructure. The control module has a multi-position key switch having a by-pass position permitting pivoting of the guard without de-energizing the motor. This permits difficult cuts to be made which would not be feasible with the guard in place. An anti-kickback pawl is also provided within the guard and prevents the saw from rejecting a workpiece in a direction opposite to its feed direction.

19 Claims, 5 Drawing Sheets

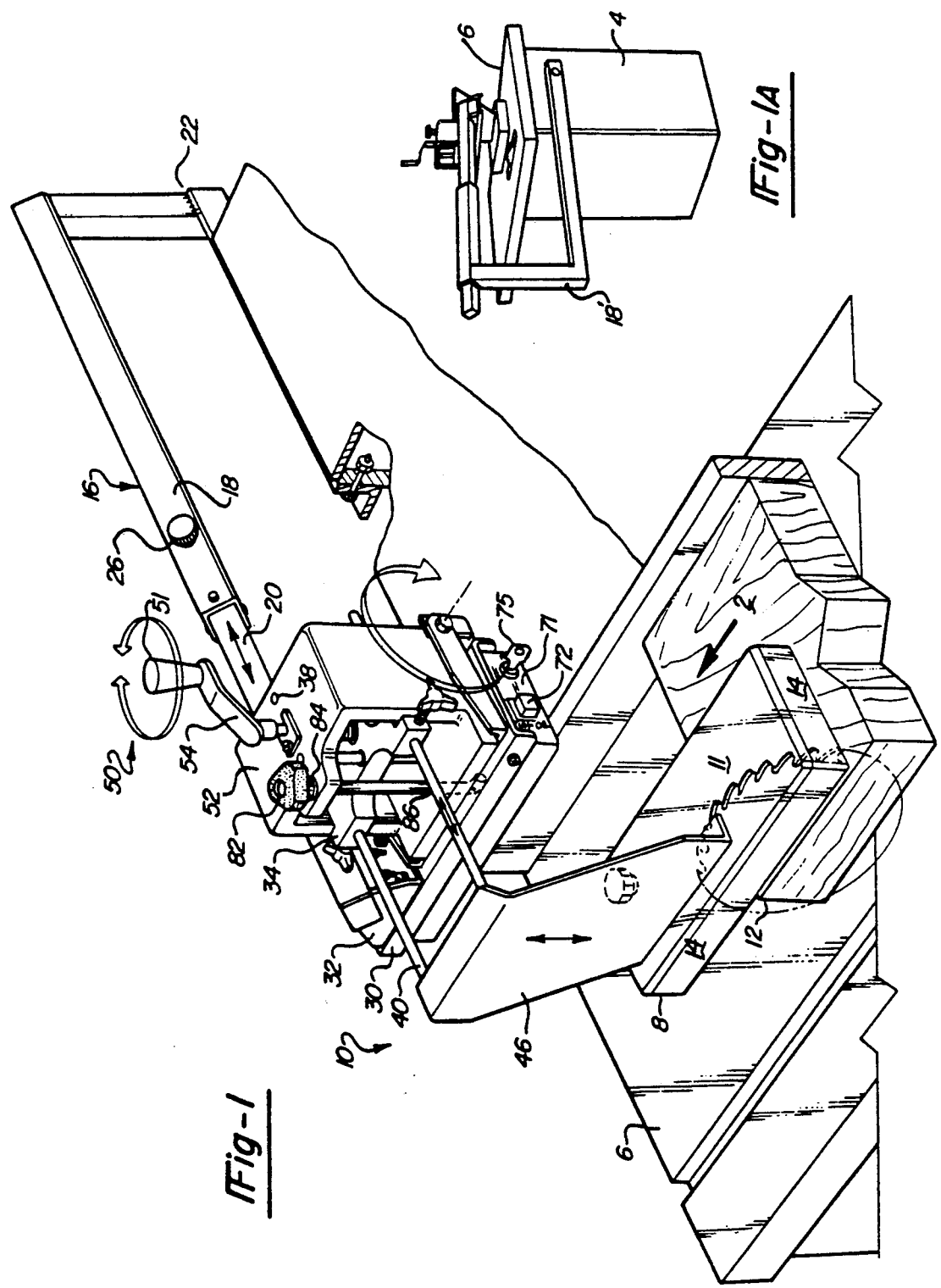

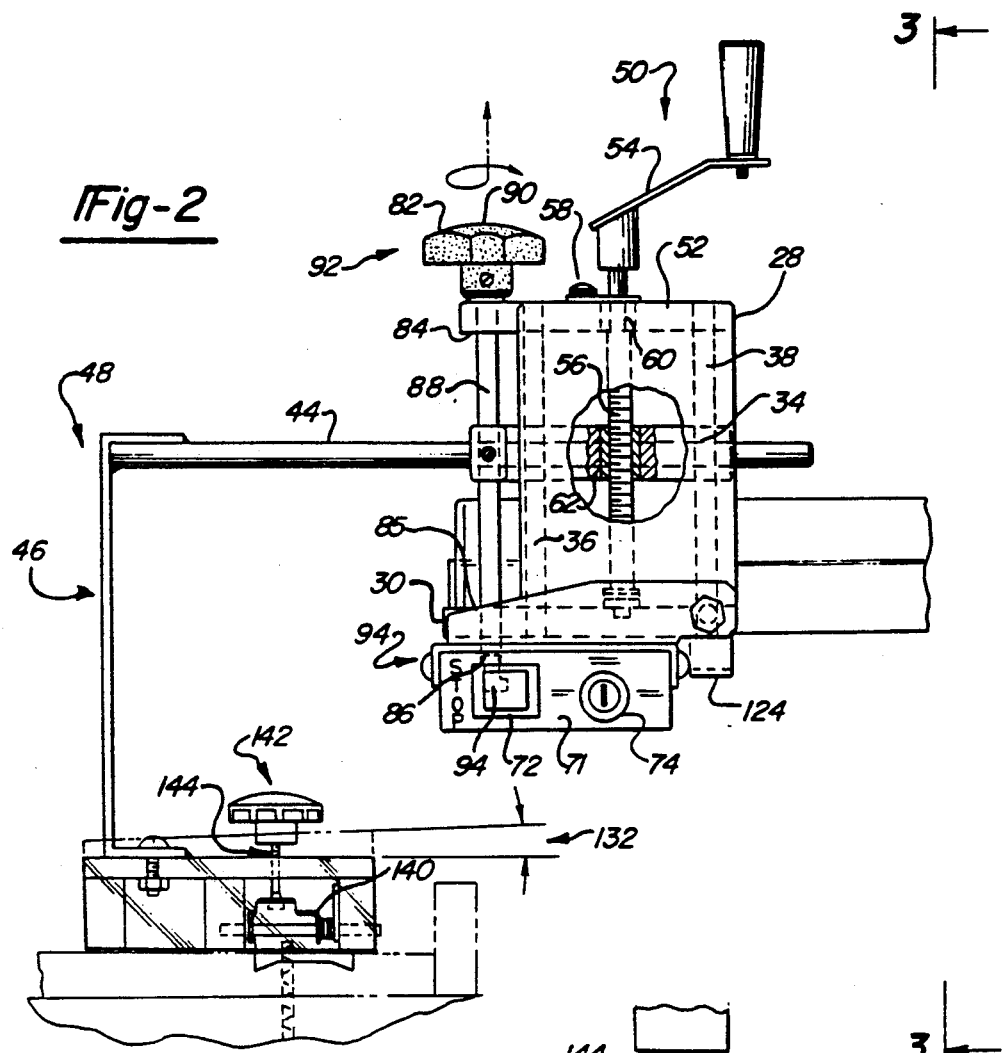
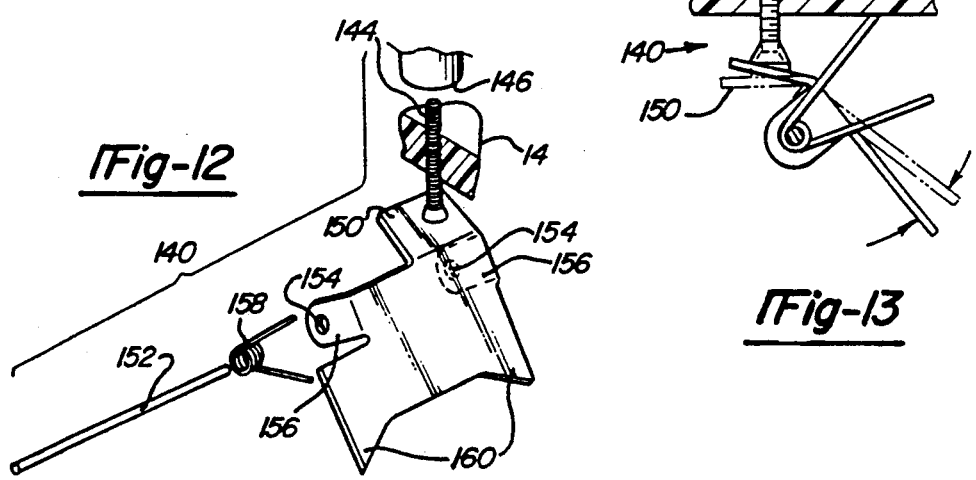

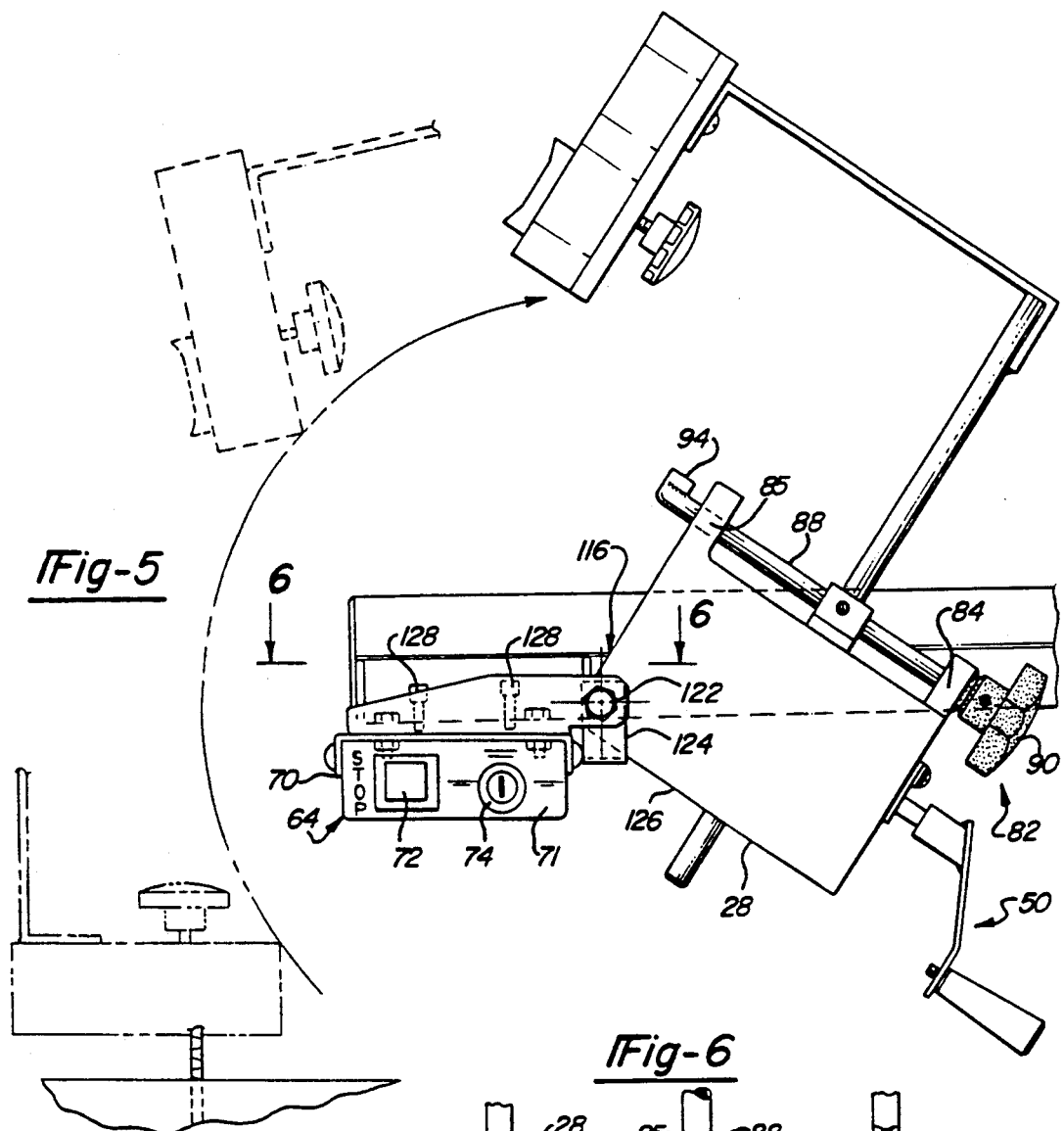
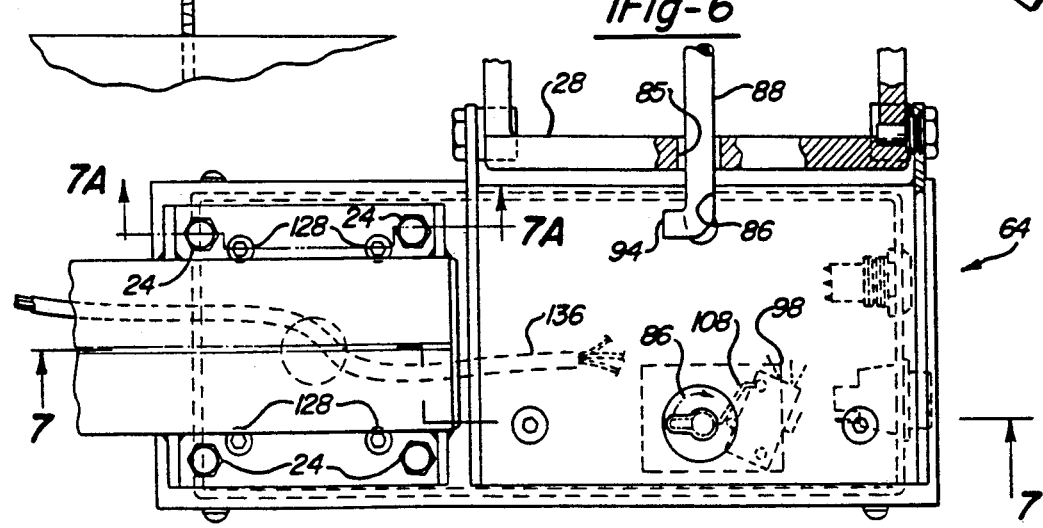

ADJUSTABLE PROTECTING GUARD APPARATUS FOR A BLADE OF A TABLE SAW

BACKGROUND OF THE INVENTION

I. Field of the Invention

The present invention relates to a saw guard, and more particularly to an adjustable protecting guard for a table saw.

II. Description of the Prior Art

Protective guards for table saw blades are known in the art. The concept of the guard which is pivotably movable away from a blade is known, and is illustrated in U.S. Pat. No. 302,041 issued to Sill. Also known in the art are saw guards with a transparent structure as is shown in U.S. Pat. Nos. 3,949,636 issued to Ball et al. and 4,625,604 issued to Handler et al.

These prior art however do not show a saw guard which is pivotal relative to a telescoping supporting bracket extending across a saw table and over a workpiece to be cut. Also not shown is a table saw guard with a multi-position key-switch and a bypass which allows the saw to continue operating when the guard is in a retracted and away position so as to permit difficult sawing operations to be undertaken.

The prior art further does not disclose a device for preventing kickback of the workpiece by the saw blade during sawing which is integrally built into a protecting saw guard.

SUMMARY OF THE PRESENT INVENTION

The present invention provides an adjustable protecting guard apparatus for a table saw which overcomes the above-mentioned disadvantages of the prior art devices.

The adjustable protecting guard apparatus of the present invention comprises a guard positioned to overlie the saw blade of a table saw at a point where the saw blade protrudes above the work surface of the table saw. The guard is of a durable transparent construction and permits accurate guiding by the user of the workpiece to be cut. A guard superstructure is provided and is attached to the end of a telescoping arm. Supporting members extending from the guard superstructure support the guard over the saw blade. The supporting members include a pair of support arms and a downwardly-extending support bracket connecting the guard to the guard superstructure.

A pivot connection is provided between the guard superstructure and a support bracket attached to the end of the telescoping arm. The guard may be pivoted away from the saw blade for certain sawing operations when the guard in its normal position would hinder the desired cutting operation. Under normal operating conditions a microswitch associated with the pivot connection causes automatic shut-off of the motor rotating the saw blade upon pivoting of the guard from over the saw blade. A multi-position keyswitch is further provided having a bypass position which permits the guard to be pivoted away without deactivation of the saw table's motor. Furthermore, the key cannot be removed when in the bypass position when the guard is in a pivoted position. An anti-kickback pawl is built into an underside of the guard and prevents the saw blade from rejecting a workpiece in a direction towards the user.

BRIEF DESCRIPTION OF THE DRAWING

A better understanding of the present invention will be had upon reference to the following detailed description, when read in conjunction with the accompanying drawing, wherein like reference characters refer to like parts throughout the several view, and in which:

FIG. 1 is a perspective view of the adjustable protecting guard apparatus of the present invention;

FIG. 1a is a perspective view of an alternately configured supporting bracket of the protecting guard apparatus of the present invention;

FIG. 2 is a frontal view of the protecting guard apparatus of the present invention;

FIG. 5 is a view similar to that shown in FIG. 2 and further showing the pivotal characteristics of the protecting guard apparatus of the present invention;

FIG. 6 is a cut-away view taken along lines 6—6 of FIG. 5;

FIG. 12 is an exploded view of the anti-kickback device of the protecting guard of the present invention; and FIG. 13 is an end view of the anti-kickback device shown in FIG. 12 showing the pivotal characteristics of the anti-kickback device.

DETAILED DESCRIPTION OF THE PREFERRED EMBODIMENT OF THE PRESENT INVENTION

Figure 3:
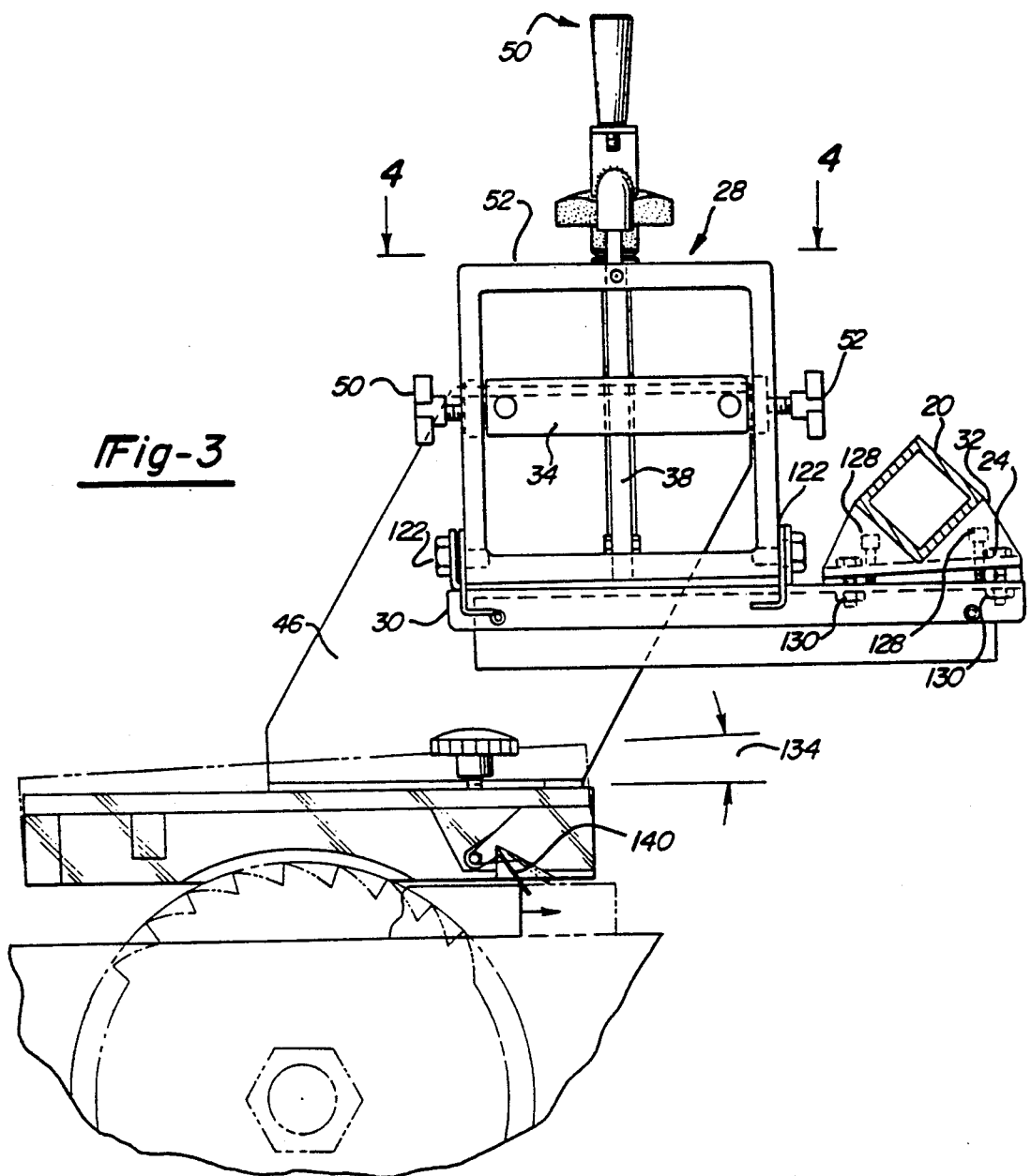
FIG. 3 is a side view taken along line 3—3 of FIG. 2.

Referring to FIG. 1, a preferred embodiment of the adjustable protecting guard apparatus 10 for a blade of a rotary saw is shown. The protecting guard apparatus 10 has a guard 8 positioned to overlie a blade 12 of a table saw. The guard 8 is preferably rectangular in shape and further has an upper face 11 and downwardly extending side members 14. In a preferred embodiment, the guard 8 is of a transparent construction as to permit visual observation of the sawing operation taking place. The guard 8 is positionable to overlie the saw blade 12 of the table saw 6 at such a height so as to permit a workpiece 2 to be fed underneath.

A telescoping arm 16 supports the guard 8 in position above the saw blade 12. The telescoping arm 16 is constructed from an L-shaped first tubular member 18 and a second 20 tubular member. The first tubular member 18 is attachable to an edge 22 of the saw table and extends above and across the work surface of the saw table as shown. The second tubular member 20 is telescopically inserted within the first member 18 and is slidably extendable in a direction normal to the face of the saw blade 12. Referring to FIG. 3, brackets 32 are attached near the end of the second tubular member 20. The brackets 32 are fastened to a horizontal base 30 by bolts 24 or any other means known in the art. The second tubular member 20 is horizontally adjustable within the first tubular member 18 and locative therein by means of a locking knob 26 located at a point where both first 18 and second 20 tubular members are coaxial.

In an alternative embodiment, as shown in FIG. 1A, the first tubular member indicated as tubular member 18' is substantially U-shaped and is attachable to a cabinet 4 of the saw table 6.

Figure 4:
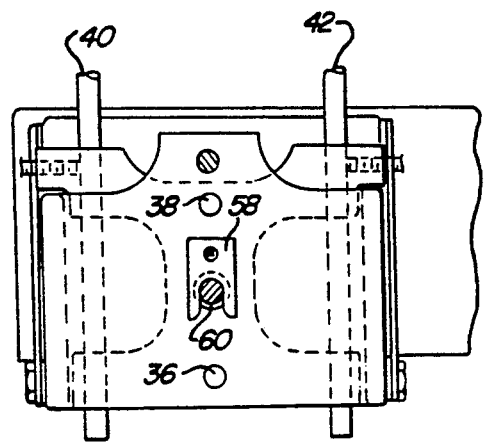
FIG. 4 is a top view taken along line 4—4 of FIG. 3.

Referring to FIGS. 1-3 and 5, a guard superstructure 28 is attached upon the horizontal base 30. The guard superstructure 28 has a generally rectangular shape about an open interior. A guide plate 34 is movably supported within the interior of the guard superstructure 28 by means of first 36 and second 38 support rods extending vertically within the open interior of the guard superstructure 28 and supported at upper and lower ends thereof, as shown in FIGS. 2 and 4. First support arm 40 and second support arm 42 extend horizontally through the guide plate 34. A downwardly-extending support bracket 46 is attached to the ends of support arms 40 and 42 as shown. The downwardly-extending support bracket 46 is secured to the top surface of the guard 8 by bolts, screws, or other means known in the art. A pair of locking knobs 50 and 52 are provided on the edges of the guide plate 34 which permit the support arms 40 and 42 and guard body 8 to be locked to the guide plate 34.

A height adjustment crank 50 is further provided and extends above a top surface 52 of the guard superstructure 28. The crank 50 has a crank handle 51 connected to crank arm 54 which is attached a threaded vertical shaft 56. Referring to FIG. 4, a guide or keeper 58 secures the threaded shaft 56 to the guard superstructure 28 and prohibits vertical displacement of the vertical crank 50 relative to the superstructure 28. The threaded shaft 56 further extends vertically through the guide plate 34 at a central position thereof. The guide plate has an internally threaded nut 62 which is threadably engaged by threaded shaft 56 of the height adjustment crank 50. Rotation of the height adjustment crank 50 in a first direction results in raising the guide plate 34 and guard 8 and rotation of the height adjustment crank in the opposite direction results in lowering the guide plate 34 and the guard 8 by means of the structural connections indicated above. In this manner the guard 8 may be horizontally and vertically adjusted to optimize its position above the saw blade 12 and workpiece 2 to be cut.

Figure 7:
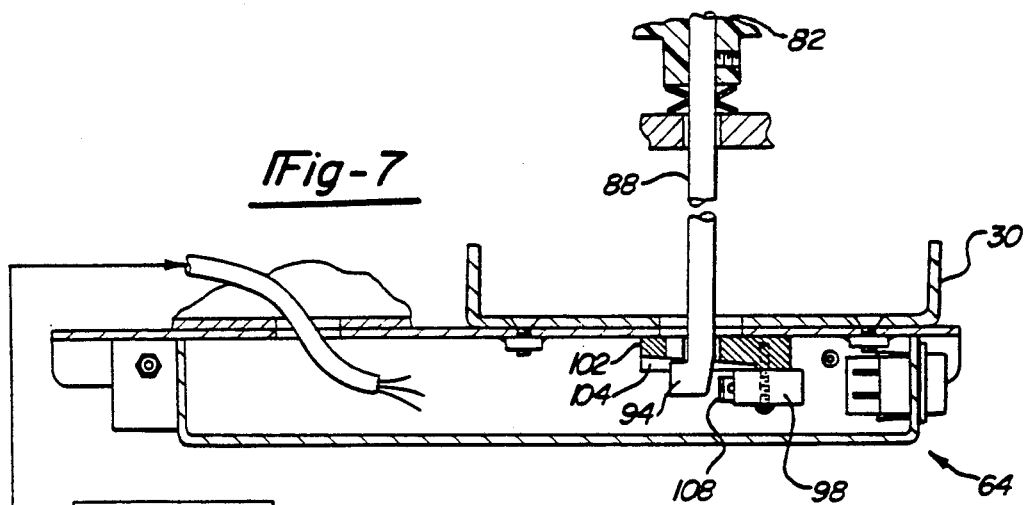
FIG. 7 is a cut-away view taken along lines 7—7 of FIG. 6.
Figure 10:
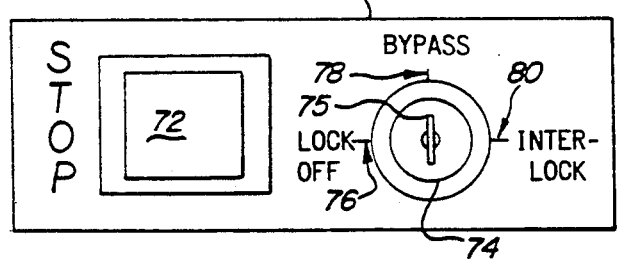
FIG. 10 is a sectional view of the three-position keyswitch of the protecting guard of the present invention.

Referring to FIGS. 5 through 7, a circuit module 64 is attached to a bottom surface of the base 30. The opposing sides of the circuit module 64 are attached to mounting flanges 70 of the base 30 and suspended beneath the base 30. A front face 71 of the circuit module 64 is provided with a stop button 72 and a multi-position key switch 74. Referring to FIG. 10, the key switch 74 is rotatable between a lockoff position 76, a bypass position 78, and an interlock position 80. The significance of the three key switch positions 76-80 will be discussed hereinafter.

Figure 8:
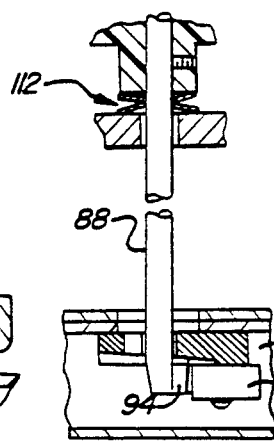
FIG. 8 is a sectional view of the locking rod of the adjustable protecting guard of the present invention.
Figure 9:
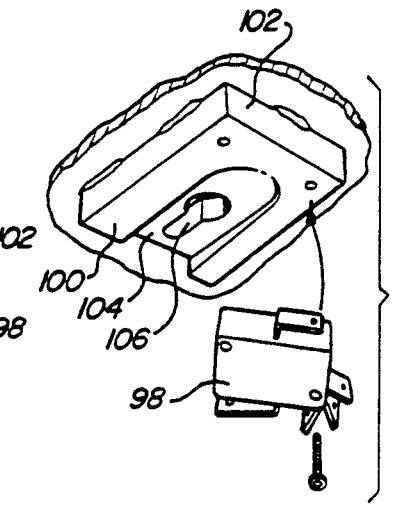
FIG. 9 is an exploded view of the microswitch of the adjustable protecting guard of the present invention.

Referring to FIG. 2, a locking rod 82 extends through apertures 84 and 85 provided in the top and bottom of the guard superstructure 28, as well as through an aperture 86 provided in the top surface of the circuit module 64. The locking rod 82 has a stem 88, a knob 90 attached to the upper end 92 of the stem 88 and a dog 94 provided at a lower end of stem 88. Referring to FIGS. 6 through 9 a microswitch 98 is provided within the circuit module 64 and affixes to a bottom face 100 of a cam guide 102. The cam guide 102 is in turn affixed to an inside surface of the circuit module 64, as shown in FIG. 7. The cam guide 102 is further provided with a tapered surface 104 through which is formed an aperture 106 for the locking rod 82 as shown in FIG. 9. A tang 108 extends from the microswitch 98 and is contacted by the dog 94 of the locking rod 82 when the locking rod 82 is in a locked position, as is shown in FIG. 8. When the locking rod 82 is in the locked position a pair of spring washers 112 located between the top surface of the guard superstructure 28 and the base of the knob 90 are compressed and the dog 94 is forceably engaged with the taper surface 104 of the cam guide 102 to lock the guard superstructure 28 to the support bracket 30. When in an opened position, as shown in FIG. 7, the dog 94 of the locking rod 82 is disengaged from the tang 108 of the microswitch 98. In this state, microswitch 98 terminates the power being delivered to the table saw's motor when the key switch 74 is in the interlocked position. When the locking rod 82 is in the unlocked position, the guard superstructure may be pivoted on the support bracket as shall be explained below.

Referring again to FIG. 5, a hinged connection 116 is provided between the lower edge of the guard superstructure 28 opposite the guard 8 and the base 30. The guard superstructure 28 is hinged to the base by bolts 122 or other suitable fasteners as shown in FIG. 3. When the locking rod 82 is in the unlocked position, the guard superstructure 28 and the guard 8 may be pivoted away from the saw blade 12, as is shown in FIG. 5.

In order for the saw to continue operating when the table saw guard superstructure 28 is pivoted as shown in FIG. 5, the key switch 74 must be set in the bypass position 78. In the bypass position 78 the key 75 cannot be removed from the key switch 74, thus requiring the presence of the key 75 inserted in the key switch 74 when the guard superstructure 28 is in the pivoted position. In this manner, the sawing operations which require that the guard 8 be pivoted away from the workpiece 2 may be undertake only when supervisory authority in possession of the key 75 is present.

Stop members 124 are attached to the side of the mounting flanges 70 of base 30. The stop members 124 engage an edge 126 the guard superstructure 28 and support it in its pivoted overhead position.

Figure 7A:
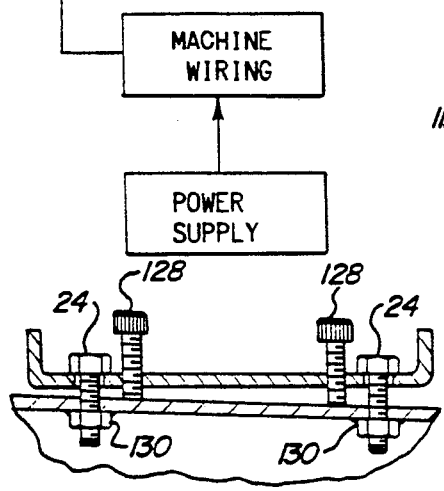
FIG. 7a is a sectional view of the adjusting bolts of the guard of the present invention.

Referring to FIGS. 3 and 7a, a plurality of adjusting bolts 128 are provided. The adjusting bolts 128 are disposed between the bracket 32 fastened to the second tubular member 20 and the base 30 upon which the guard superstructure 28 is supported. The purpose of the adjusting bolts 128 is to overcome cantilevering effects which are inherent in an overhead suspended protection guard. In a preferred embodiment, pairs of adjusting bolts 128 are positioned in the manner indicated above and are complemented by the bolts 24 disclosed above with securing nuts 130 for adjustably supporting the base 30 relative to the bracket 32 attached to the second tubular member 18. In this manner, the guard superstructure 28 of the present invention is adjustable so that the guard 8 rests squarely on the workpiece 2. Referring also to FIGS. 2 and 3, adjustment capability of the adjustment bolts 128 are indicated by the transverse and longitudinal angles 132 and 134 of the guard 8 relative to the plane of the surface of the table saw 6.

Figure 11:
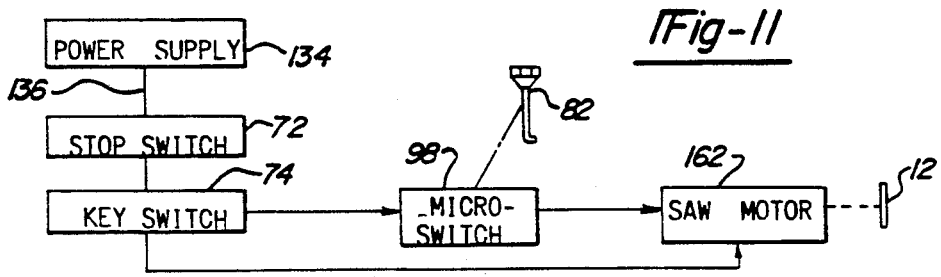
FIG. 11 is a block diagram of the electrical circuit of the protecting guard of the present invention.

Referring to FIG. 11, a block diagram of the electrical circuit inside circuit module 64 is shown. An external power supply 134 is connected to the circuit module 64 by a pair of electrical lead wires 136 which extend between the saw motor 162 of the saw table and the circuit module 64, through the telescoping arm 16, in the fashion shown in FIG. 6. Referring to FIG. 11, the wiring 136 connects the power supply 134 to the stop button 72. The stop button 72 is connected to the key switch 74. The key switch 74 in the lock-off position 76 terminates the power to the saw motor 162 rotating the saw blade 12. When the key switch 74 is in the interlocked position 80, the locking rod 82 must be in the locked position to close the contacts of microswitch 98 in order to provide electrical power to the saw motor. The bypass position 78, as previously discussed, bypasses the microswitch 98 and provides electrical power to the saw motor 162 when dog 94 of the locking rod 82 is disengaged from the microswitch 98. In this state the guard superstructure 28 and the guard body 8 may be pivoted up and away from the saw blade 12 permitting use of the table saw without the protection guard 8 as previously described.

Referring to FIGS. 2, 3, 12 and 13 an anti-kickback pawl 140 is shown. The anti-kickback pawl 140 fastens to one of the side 14 of the guard 8. A pawl adjustment knob 142 is disposed external to upper face 11 of the guard 8 and is connected to a threaded screw 144 extending through a threaded aperture in the guard 8. The internal end of the threaded screw 144 contacts a tab 150 provided on the upper edge of the pawl 140. The pawl 140 is pivotally secured to the side 14 of the guard 8 by a pawl stem 152 which extends through openings 154 provided in opposing ears 156 of the pawl 140 and engages the side 14 of the guard 8. A spring 158 biases the pawl in a direction downward towards the workpiece 2. Lower edge of the pawl 160 has a pair of pointed teeth 140 which extend beneath the plane formed by the lower edges of the sides 14 of the guard 8. During sawing operations, if the blade 12 of the saw transfers forces to a workpiece in an opposing direction which exceed those forces generated in the direction of the feed, the teeth 160 of the pawl 140 will penetrate into the workpiece when its motional direction is reversed and will prevent the workpiece from being expelled in the direction of the user. In this fashion, injuries that might otherwise occur are prevented.

Having described my invention many embodiments will become apparent to those skilled in the art to which it pertains.

I claim:

1. An adjustable protecting guard apparatus for a saw blade of a table saw, comprising:
    a guard positionable to overlie said saw blade of said table saw;
    means for adjustably supporting said guard above said saw blade;
    means for pivoting said guard away from said saw blade; and
    means for selectively terminating electrical power to a motor rotating said saw blade upon pivoting of said guard away from said blade;
    wherein said means for adjustably supporting said guard comprises a telescoping arm, said telescoping arm extending overhead said table saw above a workpiece, said telescoping arm being adjustable to position said guard to overlie said saw blade;
    wherein said means for adjustably supporting said guard further comprises a support bracket attached to a free end of said telescoping arm and a guard superstructure attached to said supporting bracket, said guard superstructure including means for controlling the height of said guard with respect to said saw blade;
    wherein said guard superstructure further comprises a pair of vertically and horizontally displaceable support arms and a downward-extending support bracket attached to said pair of support arms, said downward-extending support bracket being attached to said guard.

2. The protecting guard apparatus as described in claim 1, wherein said telescoping arm comprises first and second tubular members, said second tubular member being slidably received within said first tubular member, said first member being secured to a side of said saw table.

3. The protecting guard apparatus as described in claim 2, further comprising a locking knob for locking said first and second tubular members relative to each other.

4. The protecting guard apparatus as described in claim 1, wherein said telescoping arm comprises first and second tubular members, said second tubular member being slidably received within said first tubular member, said first tubular member being attachable to a cabinet of said table saw.

5. The protecting guard apparatus as described in claim 1, wherein said guard superstructure further comprises a guide plate vertically displaceable within said guard superstructure, said guard superstructure further having first and second vertical guide rods to slidably guide said guide plate in a vertical direction and wherein said pair of support arms are slidably attached to said guide plate.

6. The protecting guard apparatus as described in claim 5, wherein said guard superstructure further comprises a height adjustment crank having a vertically disposed threaded rod and wherein said guide plate has a threaded nut threadably engaged by said threaded rod so that said guide plate, support arms, and guard are vertically displaced along said first and second guide rods by a rotation of said crank.

7. The protecting guard apparatus as described in claim 5, wherein said guide plate has at least one locking member to lock said support arms to said guard plate.

8. The protecting guard apparatus as described in claim 1, wherein said means for selectively providing electrical power to a motor rotating said saw blade comprises a circuit module secured to said support bracket, said circuit module having a stop switch and a multi-position key switch on a front face thereof.

9. The protecting guard apparatus as described in claim 8, wherein said key-switch has a lock-off position terminating electrical power to said motor rotating said saw blade, a bypass position, and an interlock position.

10. The protecting guard apparatus as described in claim 8, wherein said circuit module further comprises a microswitch controlling the electrical power to said motor when said key switch is in said interlock position.

11. The protecting guard apparatus as described in claim 10, said means for selectively providing electrical power to a motor further comprises a locking rod rotatable between a locked and an unlocked position, said locking rod having a dog engaging said microswitch in said locked position of said locking rod, said dog actuating said microswitch to provide electrical power to said motor when said key switch is in said interlock position, said microswitch further operative to terminate electrical power to said motor when said locking rod is in said unlocked position.

12. The protecting guard apparatus as described in claim 11, wherein said bypass position of said key switch provides electrical power to said motor when said locking rod is in said unlocked position.

13. The protecting guard apparatus as described in claim 12, further comprising a hinged connection between said guard superstructure along a lower edge opposite said supporting bracket, said hinged connection permitting said guard superstructure to pivot, displacing said guard away from said saw blade.

14. The protecting guard apparatus as described in claim 13, wherein said locking rod in said locked position locks said guard superstructure to said support bracket and in said unlocked position permits said guard superstructure to be pivoted relative to said support bracket.

15. The protecting guard apparatus as described in claim 14, further comprising at least one stop member secured to said support bracket adjacent to said hinged connection to prevent said guard superstructure from contacting said table saw when said guard is pivoted away from said saw blade.

16. The protecting guard apparatus as described in claim 1, wherein said adjustable protecting guard apparatus further comprises an anti-kickback pawl, said anti-kickback pawl extending downwardly at an angle from said guard body, said anti-kickback pawl engaging a workpiece to be cut when said saw blade attempts to reject said workpiece in a direction opposite to a feed direction of said workpiece, said anti-kickback pawl preventing injury to a user by restraining said workpiece from being kicked back in a direction opposite to said feed direction.

17. The protecting guard apparatus as described in claim 1, wherein said guard is constructed of a transparent material.

18. The protecting guard apparatus as described in claim 1, further comprising means for adjusting said guard to squarely engage a workpiece.

19. An adjustable protecting guard apparatus for a saw blade of a table saw, comprising
a guard positionable to overlie said saw blade of said table saw;
a telescoping arm supporting said guard above said table saw;
a support bracket attached to a free end of said telescoping arm;
a guard superstructure connecting said guard to said support bracket, said guard superstructure pivotably attached to said support bracket permitting said guard to be pivoted away from said saw blade, said guard superstructure including means for controlling the height of said guard with respect to said saw blade;
a circuit module secured to said support bracket, said circuit module having a multi-position key switch on a front face thereof for providing electrical power to said motor;
locking means rotatable between a locked and an unlocked position for locking said guard superstructure to said support bracket prohibiting the guard from being pivoted away from said saw blade;
a microswitch electrically connected between said motor and said multi-position key switch, said microswitch responsive to said locking means being in said locked position to terminate electrical power to said motor when said multi-position key switch is in said locked position.

* * * * *